(12) United States Patent
Gazzola et al.

(10) Patent No.: US 8,045,477 B2
(45) Date of Patent: Oct. 25, 2011

(54) SMART PROTECTION ESCALATION MECHANISM PREVENTION

(75) Inventors: Maurizio Gazzola, Milan (IT); David Bianchi, Cambiago (IT); Giovanni Martinelli, Lombardia (IT); Gabriele Maria Galimberti, Bovisio Masciago (IT)

(73) Assignee: Cisco Technology, Inc., San Jose, CA (US)

( * ) Notice: Subject to any disclaimer, the term of this patent is extended or adjusted under 35 U.S.C. 154(b) by 111 days.

(21) Appl. No.: 12/504,872

(22) Filed: Jul. 17, 2009

(65) Prior Publication Data

US 2011/0013507 A1 Jan. 20, 2011

(51) Int. Cl.
*G01R 31/08* (2006.01)

(52) U.S. Cl. .......................................... 370/242

(58) Field of Classification Search ........................ None
See application file for complete search history.

(56) References Cited

U.S. PATENT DOCUMENTS

| | | | |
|---|---|---|---|
| 5,781,535 A * | 7/1998 | Russ et al. | 370/248 |
| 7,082,467 B2 * | 7/2006 | Border et al. | 709/227 |
| 7,266,715 B1 * | 9/2007 | Bazzinotti et al. | 714/4.4 |
| 2005/0265346 A1 * | 12/2005 | Ho et al. | 370/392 |

* cited by examiner

*Primary Examiner* — Kevin C Harper
(74) *Attorney, Agent, or Firm* — Edell, Shapiro & Finnan, LLC

(57) ABSTRACT

Techniques are provided for detecting at a controller associated with a physical layer of a network an occurrence of a failure within the physical layer of the network. In response to detecting the failure, the controller sends messages to at least first and second nodes in a transport layer of the network, where the messages are configured to indicate normal operations in the physical layer so as to prevent execution of transport layer protection processes for a period of time.

20 Claims, 6 Drawing Sheets

SMART PROTECTION ESCALATION MECHANISM PREVENTION

TECHNICAL FIELD

The present disclosure relates to an optical transport network and more particularly to preventing transport layer link protection mechanisms from operating when physical layer mechanisms are in place within the optical transport network.

BACKGROUND

Optical transport networks, such as synchronous optical networks (SONET) or synchronous digital hierarchy (SDH) networks, are composed of a set of optical network elements connected by optical fiber links and are able to provide the functionality of transport, multiplexing, switching, management, supervision and survivability of optical channels carrying client signals. Optical network elements include optical cross-connects (OCXs) for rerouting an optical signal from an input port to an output port, reconfigurable optical add-drop multiplexers (ROADMs) for the adding and dropping of wavelengths, transponders, routers, and various optical-to0electrical (O/E) and electrical-to-optical (E/O) converters.

Optical transport networks employ a number of path protection and link protection mechanisms to mitigate data losses when a communications failure occurs between two nodes of the network. In both path protection and link protection, backup resources are identified during connection setup. In path protection, when a failure occurs between two nodes, the source and destination nodes dynamically determine an alternate path using transport layer communications in order to restore the connection (a process called "restoration"). In link protection, when a failure occurs between two nodes, the adjacent nodes dynamically determine an alternate link using physical layer communications in order to restore the connection, while the source and destination nodes remain unaware of the failure. To prevent contention between the two mechanisms, current networks usually employ either path protection or link protection with the alternate mechanism disabled. It would be desirable to operate the optical transport network with both mechanisms enabled.

DESCRIPTION OF EXAMPLE EMBODIMENTS

Overview

Techniques are provided for detecting at a controller associated with a physical layer of a network an occurrence of a failure within the physical layer of the network. In response to detecting the failure, the controller sends messages to at least first and second nodes in a transport layer of the network, where the messages are configured to indicate normal operations in the physical layer so as to prevent execution of transport layer protection processes for a period of time.

Example Embodiments

Figure 1:
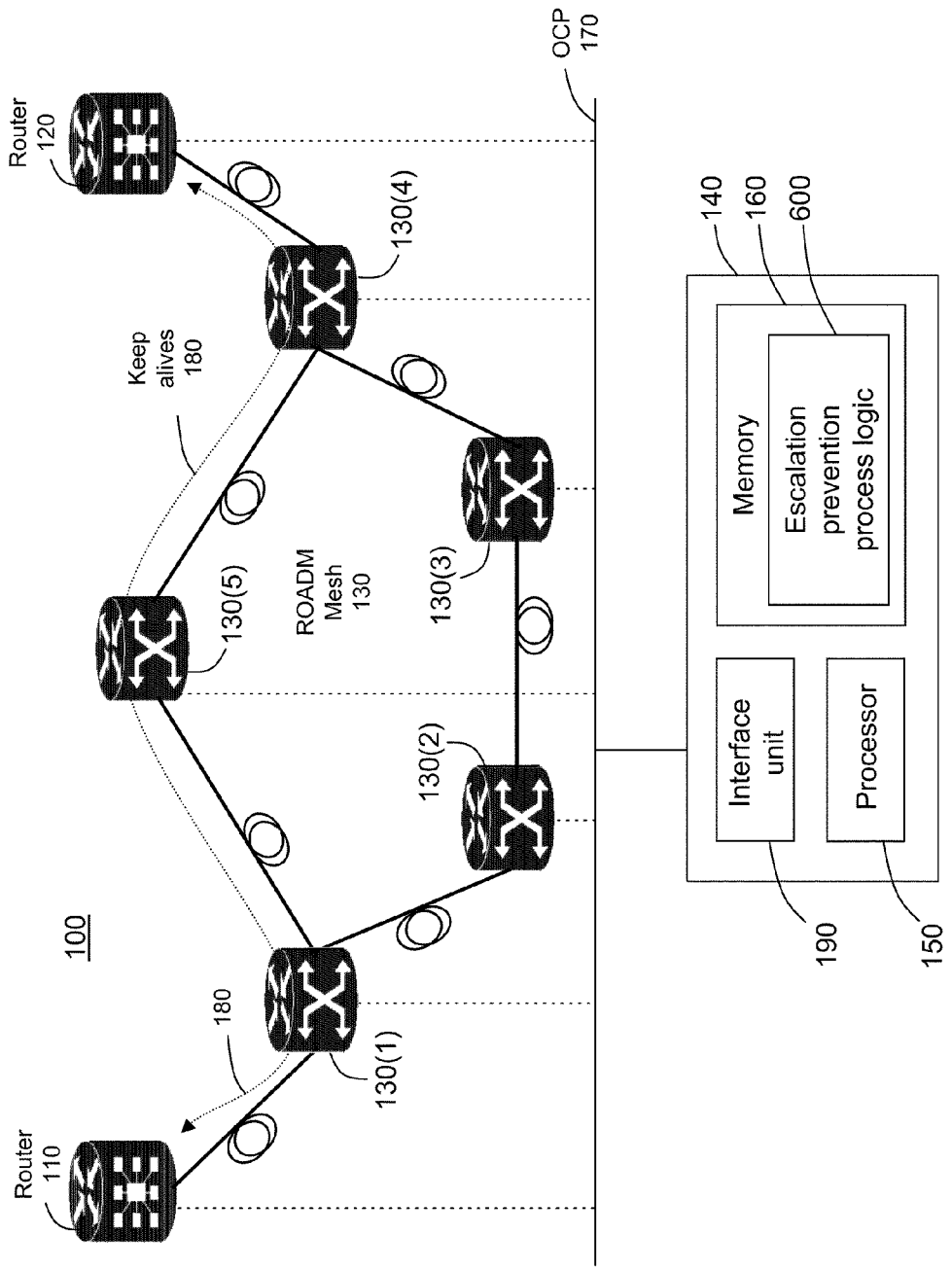
FIG. 1 is a block diagram showing an example of an optical transport network (OTN) in which a first node (e.g., a first router) and a second node (e.g., a second router) communicate keep alive messages to each other, and a controller is provided that is configured with escalation prevention process logic.

Referring first to FIG. 1, an optical transport network 100 is shown. The OTN 100 comprises a first node, e.g., router 110, and a second node, e.g., router 120. Between the first and second nodes is a mesh of network elements, e.g., reconfigurable optical add-drop multiplexer (ROADM) mesh 130 comprising ROADMs 130(1)-130(5) that operate in the physical layer of OTN 100. In the example shown in FIG. 1, the physical layer is an optical network layer. The nodes and network elements are coupled to a control plane, e.g., optical control plane 170. The coupling between optical control plane (OCP) 170 and the routers 110, 120, and the ROADMs 130 is indicated by coarse dashed vertical lines. Coupled to the control plane is a control system 140 that is configured to implement escalation prevention process logic 600. The process logic 600 will be referred to generally in conjunction with FIGS. 2-5, and described in detail in conjunction with FIG. 6. It is to be appreciated that the network 100 is simplified for illustration and that any number of routers, ROADMs, or other network elements may be present and that the network may form any topology (e.g., rings, trees, branches, or combinations thereof).

The routers 110 and 120 are part of the transport layer of network 100 and are configured to transmit keep alive messages 180 (e.g., bi-directional forwarding (BFD) keep alives) to each other. The keep alive messages 180 are depicted as a finely dashed line and are communicated through ROADMs 130(1), 130(5), and 130(4). The keep alive messages 180 are sent periodically back and forth between the routers 110, 120 to verify the point-to-point communications path between the routers 110 and 120 is viable, even when there is no data traffic. When the routers 110, 120 do not receive the keep alive messages 180 for a period of time, they will invoke a transport layer (Layer 3) protection mechanism or process, e.g., Multiprotocol Label Switching (MPLS) fast re-route (FRR) path protection, in order to restore the communications path. Other layer 3 protection mechanisms may include open shortest path first (OSPF) and intermediate system to intermediate system (IS-IS) routing protocols.

The control system 140 comprises a data processing device 150, e.g., a microprocessor, microcontroller, etc., a memory 160 or other data storage block that stores data used for the techniques described herein, and an interface unit 190. The memory 160 may be separate or part of the processor 150. Instructions for performing the escalation prevention process logic 600 may be stored in the memory 160 for execution by the processor 150. The process logic 600 generates fake keep alive messages (shown in FIGS. 4 and 5) that are sent to the routers 110, 120, to prevent transport layer protection escalation. The interface unit 190 enables communication between the control system 140 and the OCP 170, and ultimately to elements in the physical layer and transport layer of the network 100.

The functions of the processor 150 may be implemented by logic encoded in one or more tangible media (e.g., embedded logic such as an application specific integrated circuit (ASIC), digital signal processor (DSP) instructions, software that is executed by a processor, etc.), wherein the memory 160 stores data used for the computations described herein (and/or to store software or processor instructions that are executed to carry out the computations described herein). Thus, the process logic 600 may be implemented with fixed logic or programmable logic (e.g., software/computer instructions executed by a processor or field programmable gate array (FPGA)).

The control system 140 may be part of an operations support system (OSS) or other network management system (NMS), e.g., an element management system (EMS). The control system 140 may be a general purpose computer (e.g., a personal computer (PC)), a rack mounted computer, or other computer in a network or cluster. The control system 140 may run custom, proprietary, or commercial off-the-shelf applications that may be configured to implement the escalation prevention process logic 600. For example, the process logic 600 may be configured or activated via a graphical user interface by a user in a network monitoring and control center, e.g., as part of an operations, administration, provisioning, and maintenance (OAM & P) system. For simplicity, the control system 140 is not shown in the remaining figures.

Figure 2:
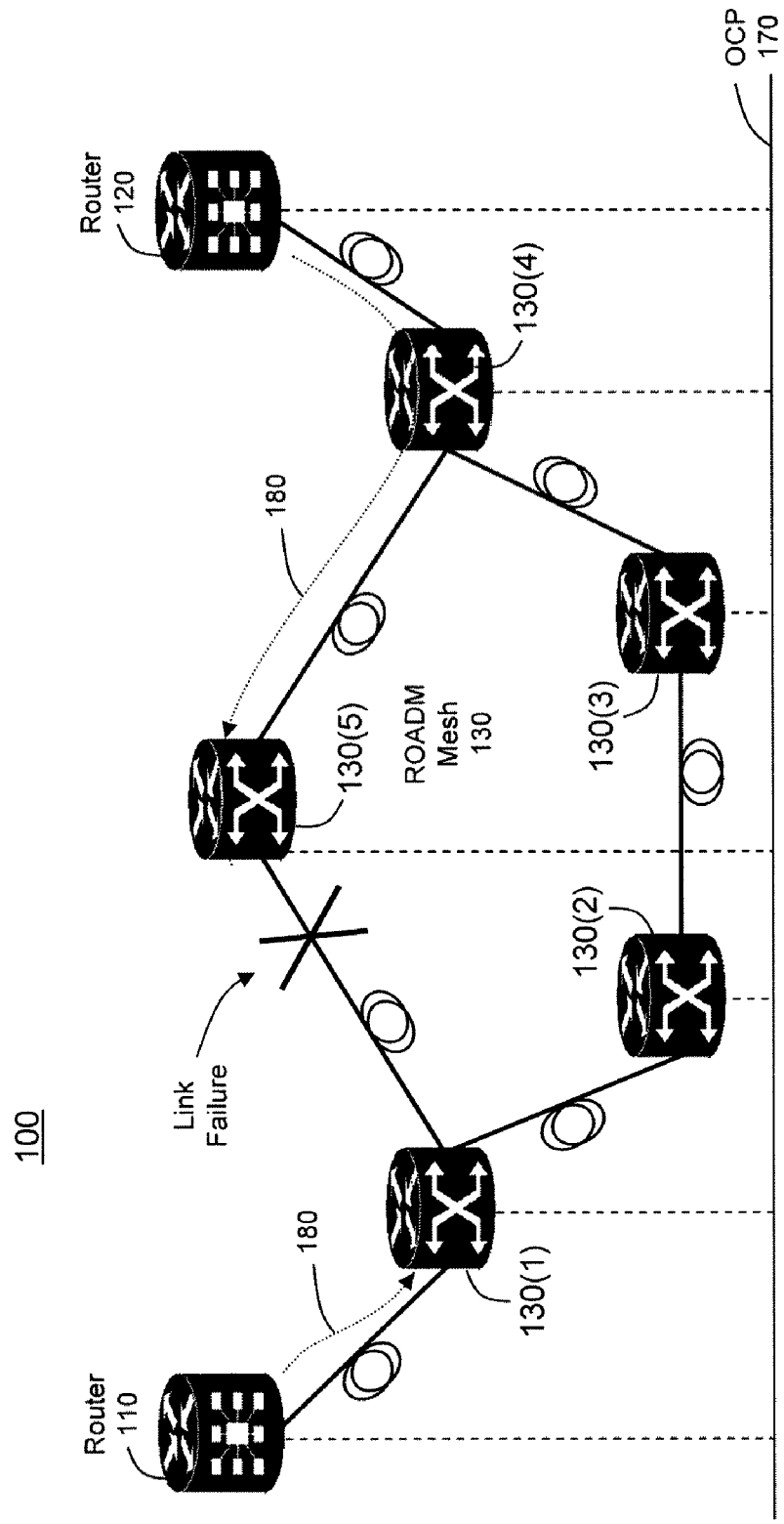
FIG. 2 is a block diagram showing the OTN from FIG. 1 in which a link failure has occurred between a first network element and a second network element.

Referring to FIG. 2, the OTN 100 is shown with a link failure between ROADM 130(1) and ROADM 130(5). The keep alive messages 180 cannot make it past the failed link as shown. After a period of time, both routers 110, 120, will initiate escalation of the transport layer protection mechanisms in an attempt to restore the connection. The escalation timing parameters of the transport layer protection mechanisms are known to the system operator. Therefore, before escalation occurs, the escalation prevention process logic 600 can be configured to preempt the transport layer protection mechanisms.

Figure 3:
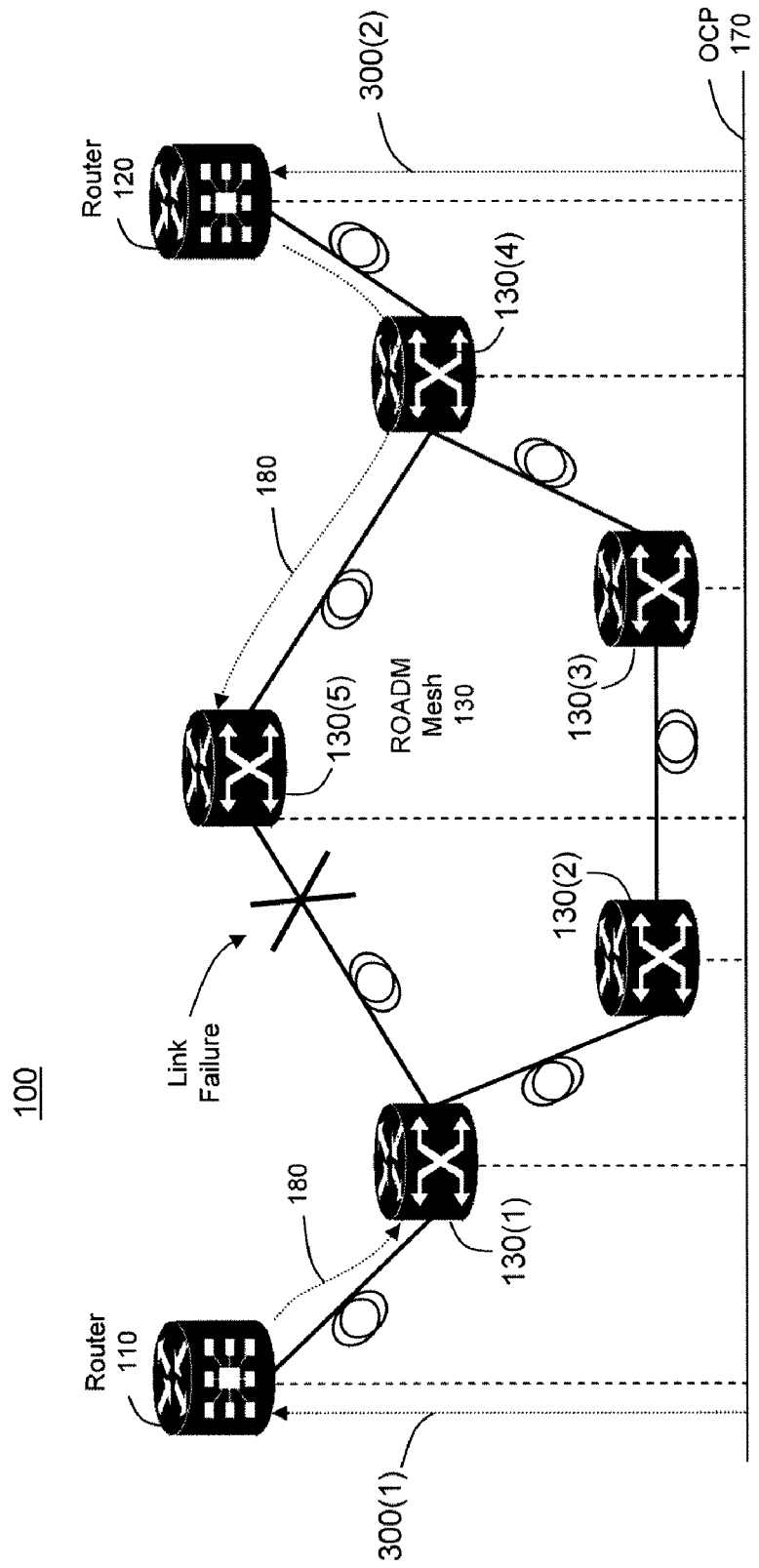
FIG. 3 is a block diagram showing the OTN from FIG. 2 in which fake keep alive messages are sent from the optical control plane to the first and second nodes.

Turning now to FIG. 3, the OTN 100 is shown with the link failure. In this example the control system 140 detects the link failure and starts the escalation prevention process logic 600. The process logic 600 generates fake keep alive messages 300(1) and 300(2) and sends them from the optical control plane 170 to the routers 110, 120, via the coupling to the optical control plane 170. With respect to router 110, the fake keep alive messages 300(1) appear as though they come from router 120, and with respect to router 120, the fake keep alive messages 300(2) appear as though they come from router 110. Thus, to the routers 110, 120, everything appears normal, and therefore the routers 110 and 120 do not institute transport layer protection mechanisms. As such, the routers 110, 120, still attempt to send the original keep alive messages 180 as shown.

Turning now to FIG. 4, the OTN 100 is again shown with the link failure. In another example, the control system 140 detects the link failure and starts the escalation prevention process logic 600. The process logic 600 generates fake keep alive messages 300(1) and 300(2) and sends them, in this case, from the data plane instead of directly from the optical control plane 170, to the routers 110, 120 via ROADMs 130(1) and 130(4), respectively. Thus, the transport layer protection mechanisms are again preempted and not invoked. In either of the examples shown in FIGS. 3 and 4, the fake keep alive messages serve to prevent execution of the transport layer protection mechanisms for a period of time. This allows for repair of the link failure in the physical layer of OTN 100.

Figure 5:
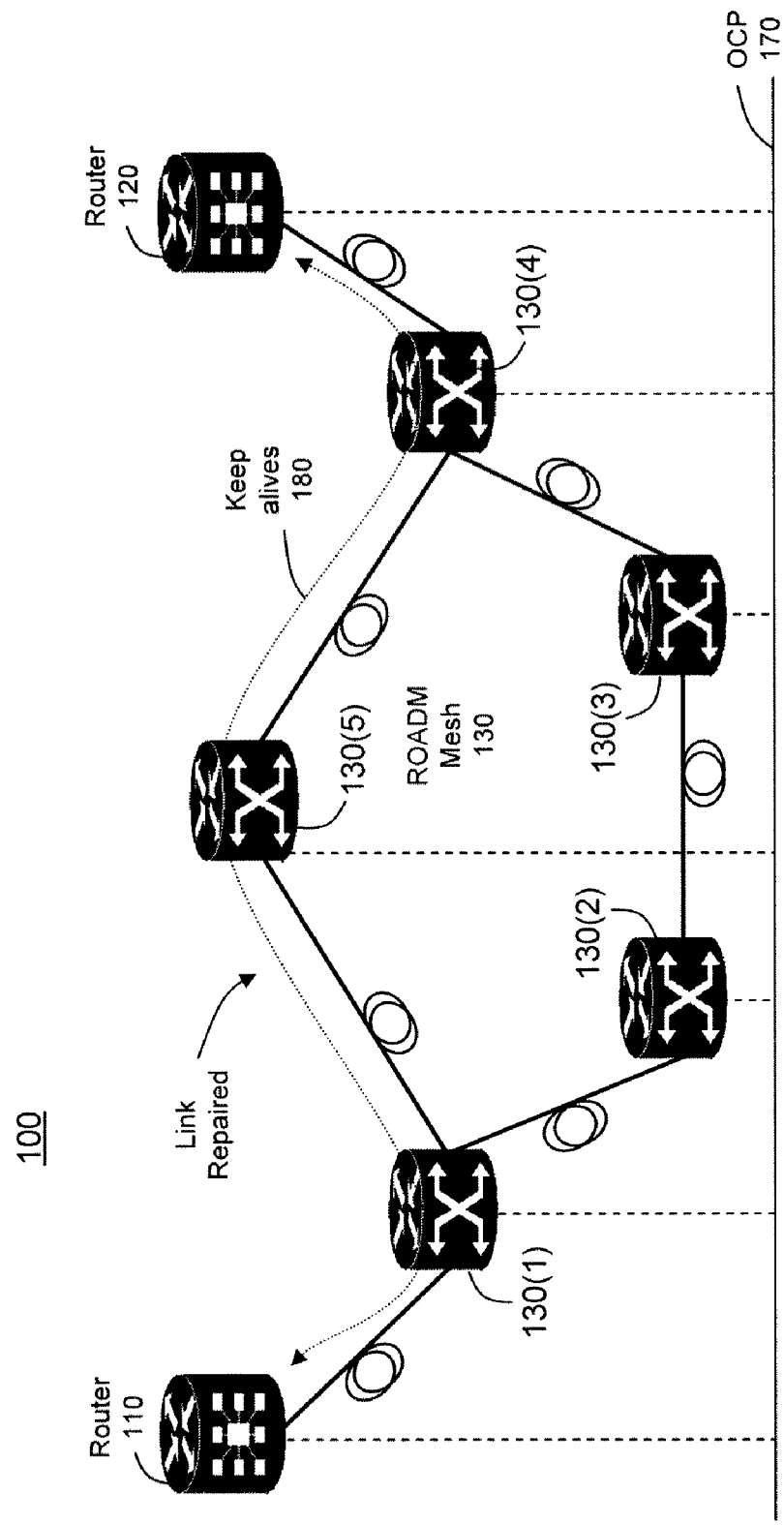
FIG. 5 is a block diagram showing the OTN from FIG. 2 in which the link failure has been repaired.

Referring to FIG. 5, the OTN 100 is shown with the link failure repaired. The fake keep alive messages have been terminated and normal keep alive traffic 180 resumes.

Figure 6:
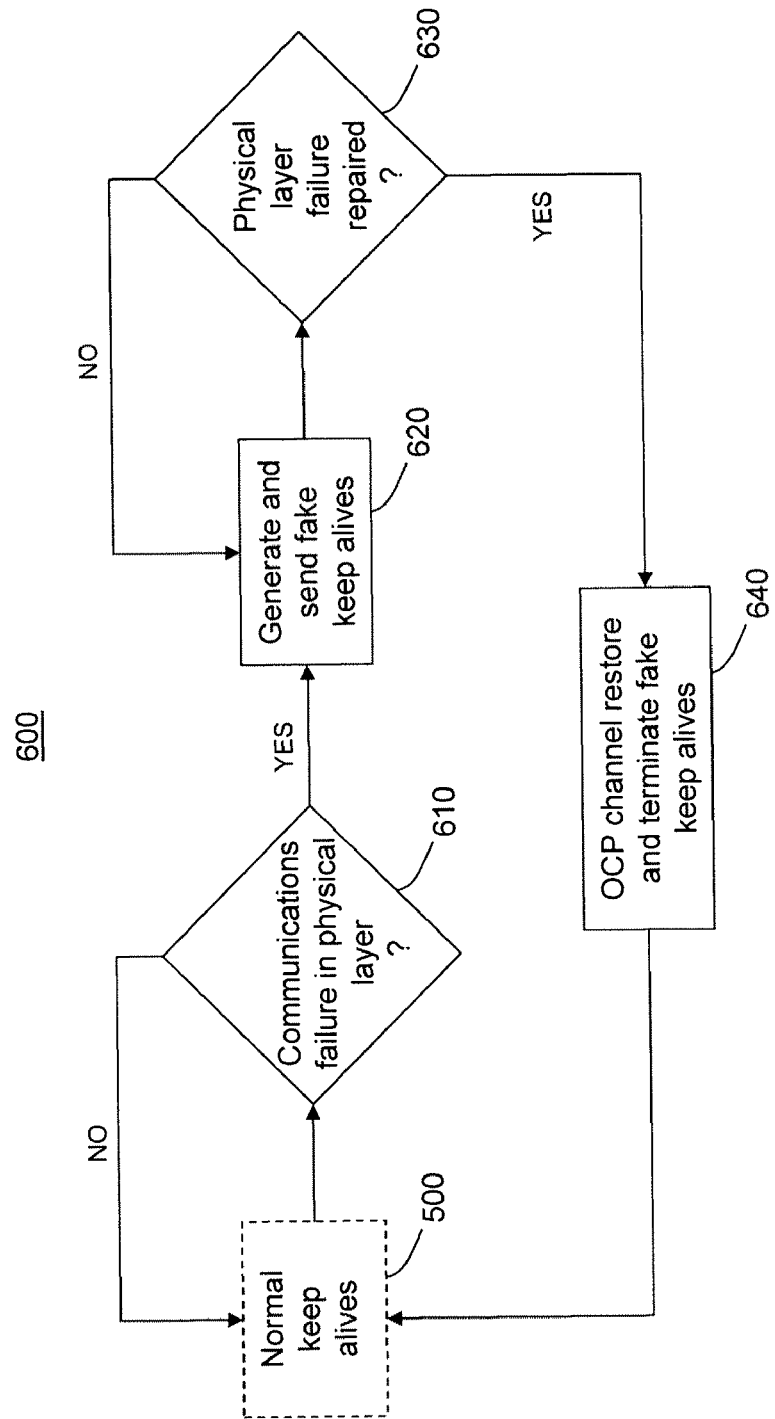
FIG. 6 is a flow chart generally depicting the escalation prevention process logic.

Referring now to FIG. 6, a flow chart generally depicting the escalation prevention process logic 600 executed in the control system 140 (FIG. 1) is shown. At 500, normal keep alive messages are sent between network nodes or network elements, e.g., between routers 110 and 120, in the transport layer of OTN 100. These normal keep alive messages are not part of the process 600 per se as indicated by the dashed box and represent normal operations in the OTN 100. The keep alive messages may be any messages or signals between network elements that require periodic communication path verification. The keep alive messages can be sent over any protocol that allows for such messages (e.g., transmission control protocol (TCP) keep alives, session initiation protocol (SIP) options keep alives, BFD keep alives, proprietary protocols, etc.). Thus, examples described herein are not limited to particular transport layer mechanisms.

Figure 4:
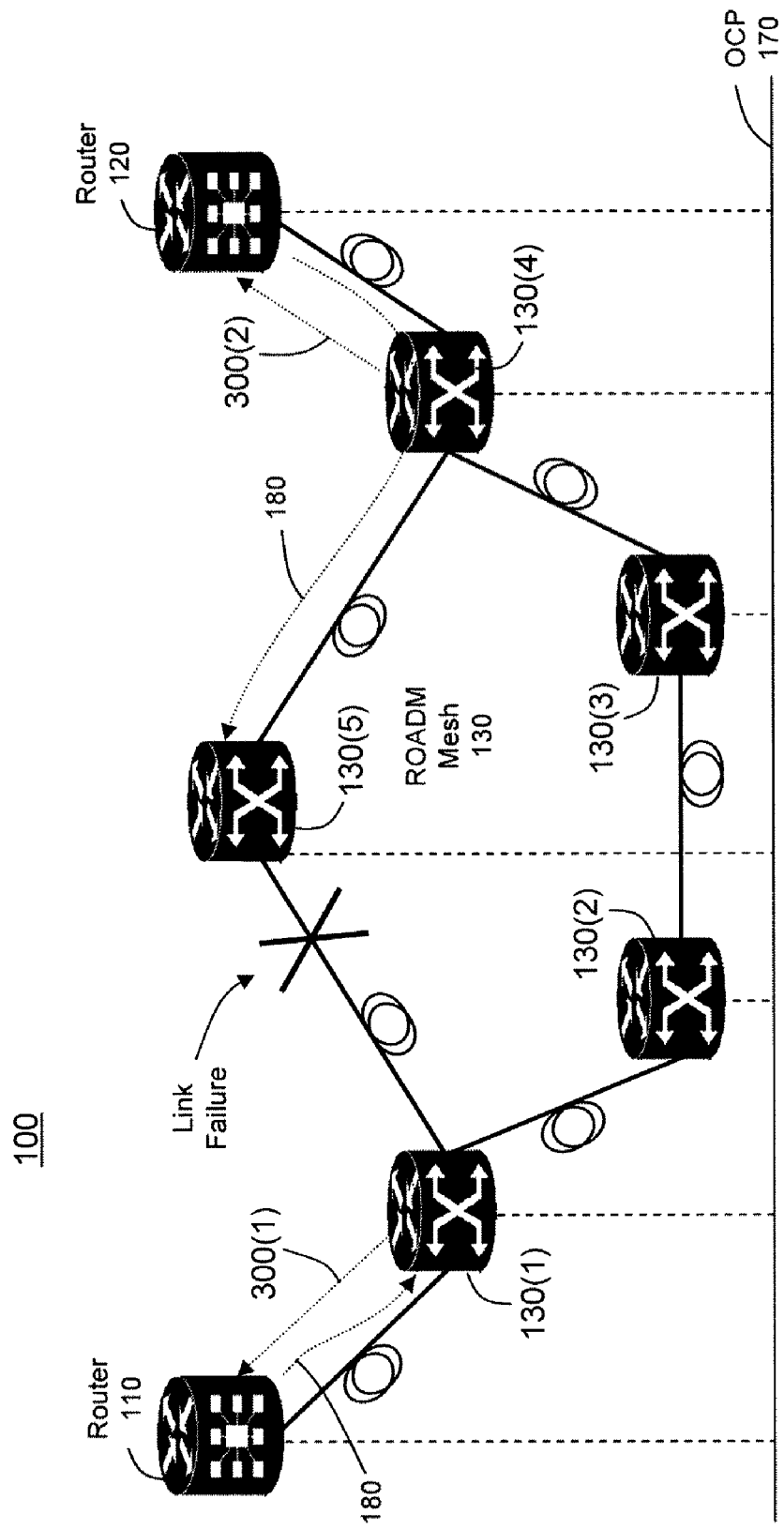
FIG. 4 is a block diagram showing the OTN from FIG. 2 in which fake keep alive messages are sent from the data plane to the first and second nodes.

At 610, a communications failure in the physical layer is detected between the two network nodes. The detection can be active or passive. For example, with active detection the communications pathway can be tested at different Open System Interconnection (OSI) model layers using a corresponding protocol, e.g., a loss of frame or excessive bit error rate may cause an alarm indication signal (AIS) to be sent by a network element on the far end of the link. When using passive detection, a control system, e.g., control system 140, waits to receive a report indicating the failure. Alternatively, the failure may be detected optically at the hardware level, e.g., using a photo diode detector, or at the media access control (MAC) layer in non-optical networks or non-optical portions of the optical transport network. If a failure is not detected or reported then normal operations continue. If a failure is detected, then at 620, fake keep alive messages are generated and sent to the two network nodes as if the failure had not occurred. Sending the fake keep alive messages keeps the two network nodes "blind" to the occurrence of the failure in the physical layer. Examples of fake keep alive messages sent by the control system 140 are shown in FIGS. 3 and 4.

In one example, the fake keep alive messages are configured to serve to replace keep alive messages sent between the first and second nodes without which the first and second nodes will invoke transport layer protection processes. The fake keep alive messages may be fake BFD messages sent to simulate normal operations in the physical layer of the network, where the fake BFD messages prevent execution or otherwise disable an MPLS FRR mechanism or similar process in the transport layer.

At 630, the control system monitors the connection or waits for a connection repaired report. If the connection is repaired then, at 640, the optical control plane restores the connection and terminates the sending of the fake keep alive messages. As long as the physical failure in unrepaired, the control system 140 continues to generate and send fake keep alive messages. In one example, the fake keep alive messages are generated for a predetermined period of time to allow for repair of the failure in the physical layer, after which the connection between nodes is dropped or the fake keep alive messages are simply terminated.

Techniques are provided herein for detecting an occurrence of a failure within the physical layer of the network, and in response to detecting the failure, sending from a controller messages to at least first and second nodes in a transport layer of the network, where the messages are configured to indicate normal operations in the physical layer so as to prevent execution of transport layer protection processes for a period of time.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
   at a controller associated with a physical layer of a network, detecting occurrence of a failure within the physical layer; and
   in response to detecting the failure, sending from the controller messages to at least first and second nodes in a transport layer of the network, wherein the messages are configured to indicate normal operations in the physical layer so as to prevent execution of transport layer protection processes for a period of time.

2. The method of claim 1, wherein sending messages comprising sending messages that are configured to replace keep alive messages sent between the first and second nodes without which the first and second nodes will invoke transport layer protection processes.

3. The method of claim 1, wherein sending messages comprises sending fake bidirectional forwarding detection messages that simulate normal operations in the physical layer of the network.

4. The method of claim 1, wherein sending messages comprises sending the messages to the first and second nodes which are routers in the transport layer of the network.

5. The method of claim 1, and further comprising generating the messages that are configured to prevent execution of a multi-protocol layer switching fast re-route mechanism in the transport layer.

6. The method of claim 1, further comprising:
   detecting at the controller that the failure in the physical layer has been repaired; and
   in response to detecting the repair, terminating the sending of the messages to the first and second nodes.

7. The method of claim 1, wherein detecting comprises detecting a failure between two reconfigurable optical add-drop multiplexers in the physical layer of the network.

8. An apparatus comprising:
   an interface unit configured to connect to elements in a physical layer and a transport layer of a network;
   a processor configured to:
      detect a failure within the physical layer; and
      in response to detecting the failure, generate and send messages to at least first and second nodes in the transport layer of the network, wherein the messages are configured to indicate normal operations in the physical layer so as to prevent execution of transport layer protection processes for a period of time.

9. The apparatus of claim 8, wherein the processor is configured to send messages that are configured to replace keep alive messages sent between the first and second nodes without which the first and second nodes will invoke transport layer protection processes.

10. The apparatus of claim 8, wherein the processor is configured to send messages that comprise fake bidirectional forwarding detection messages that simulate normal operations in the physical layer of the network.

11. The apparatus of claim 8, wherein the processor is configured to send the messages to the first and second nodes which are routers in the transport layer of the network.

12. The apparatus of claim 8, wherein the processor is further configured to generate the messages that are configured to prevent execution of a multi-protocol layer switching fast re-route mechanism in the transport layer.

13. The apparatus of claim 8, wherein the processor is further configured to detect that the failure in the physical layer has been repaired, and in response to terminate the sending of the messages to the first and second nodes.

14. The apparatus of claim 8, wherein the controller is configured to detect a failure between two reconfigurable optical add-drop multiplexers in the physical layer of the network.

15. One or more tangible computer readable media storing logic for execution and when executed operable to:
   detect an occurrence of a failure within a physical layer of a network; and
   in response to detecting the failure, generate and send messages to at least first and second nodes in a transport layer of the network, wherein the messages are configured to indicate normal operations in the physical layer so as to prevent execution of transport layer protection processes for a period of time.

16. The computer readable media of claim 15, wherein the logic that sends messages comprises logic configured to send messages that are configured to replace keep alive messages sent between the first and second nodes without which the first and second nodes will invoke transport layer protection processes.

17. The computer readable media of claim 15, wherein the logic that sends messages comprises logic configured to send fake bidirectional forwarding detection messages that simulate normal operations in the physical layer of the network.

18. The computer readable media of claim 15, wherein the logic that sends messages comprises logic configured to send the messages to the first and second nodes which are routers in the transport layer of the network.

19. The computer readable media of claim 15, wherein the logic that generates messages comprises logic configured to generate messages which are configured to prevent execution of a multi-protocol layer switching fast re-route mechanism in the transport layer.

20. The computer readable media of claim 15, further comprising logic configured to detect that the failure in the physical layer has been repaired, and in response to terminate the sending of the messages to the first and second nodes.

* * * * *